United States Patent
Wang (10) Patent No.: US 7,658,354 B2
(45) Date of Patent: Feb. 9, 2010

(54) SUCTION DEVICE AND SUPPORTING DEVICE HAVING THE SAME

(75) Inventor: Chen-Hsing Wang, Taipei (TW)

(73) Assignee: Lite-On Technology Corp., Taipei (TW)

( * ) Notice: Subject to any disclaimer, the term of this patent is extended or adjusted under 35 U.S.C. 154(b) by 117 days.

(21) Appl. No.: 11/896,322

(22) Filed: Aug. 31, 2007

(65) Prior Publication Data
US 2008/0210833 A1 Sep. 4, 2008

(30) Foreign Application Priority Data
Mar. 2, 2007 (TW) ............................... 96203466 U (51) Int. Cl.
*F16B 47/00* (2006.01)
(52) U.S. Cl. .............. 248/205.5; 248/205.6; 248/206.1; 248/363; 248/683
(58) Field of Classification Search .............. 248/205.5, 248/205.6, 205.7, 205.8, 683, 363, 206.1, 248/206.2
See application file for complete search history.

(56) References Cited
U.S. PATENT DOCUMENTS

| | | | | |
|---|---|---|---|---|
| 6,234,435 B1 * | 5/2001 | Yeh | ........................ | 248/205.5 |
| 6,308,923 B1 * | 10/2001 | Howard | .................... | 248/205.5 |
| 6,550,735 B1 * | 4/2003 | Zheng | ........................ | 248/304 |
| 6,749,160 B1 * | 6/2004 | Richter | ..................... | 248/206.2 |
| 7,007,908 B2 * | 3/2006 | Tsay | ........................ | 248/309.3 |
| 7,066,434 B2 * | 6/2006 | Kwok | ....................... | 248/205.8 |
| 7,092,521 B2 | 8/2006 | Wang | | |
| 7,293,750 B2 * | 11/2007 | Richter | ..................... | 248/205.5 |
| 2007/0262217 A1 * | 11/2007 | Wang et al. | .............. | 248/205.5 |

* cited by examiner

*Primary Examiner*—J. Allen Shriver
*Assistant Examiner*—Todd M. Epps
(74) *Attorney, Agent, or Firm*—Rosenberg, Klein & Lee (57) ABSTRACT

A suction device includes a sucking member having a connecting body connected integrally to a flexible disc body that is disposed under an upright sleeve, a connecting member disposed in the sleeve and connected to the connecting body, an operating member connected to a pivot rod extending through the sleeve, and a cam body accommodated in a cam-accommodating space in the connecting member and pivotable together with the pivot rod. The operating member is operable so as to pivot the pivot rod and the cam body such that an assembly of the connecting member and the connecting body is pulled upwardly by the cam body, thereby forming a vacant space between a central portion of the disc body and a supporting surface to which a peripheral portion of the disc body is attached sealingly.

12 Claims, 7 Drawing Sheets

SUCTION DEVICE AND SUPPORTING DEVICE HAVING THE SAME

CROSS-REFERENCE TO RELATED APPLICATION

This application claims priority of Taiwanese Application No. 096203466, filed on Mar. 2, 2007.

BACKGROUND OF THE INVENTION

1. Field of the Invention

The invention relates to a suction device, more particularly to a suction device that is repositionable, and a supporting device having the same.

2. Description of the Related Art

Figure 1:
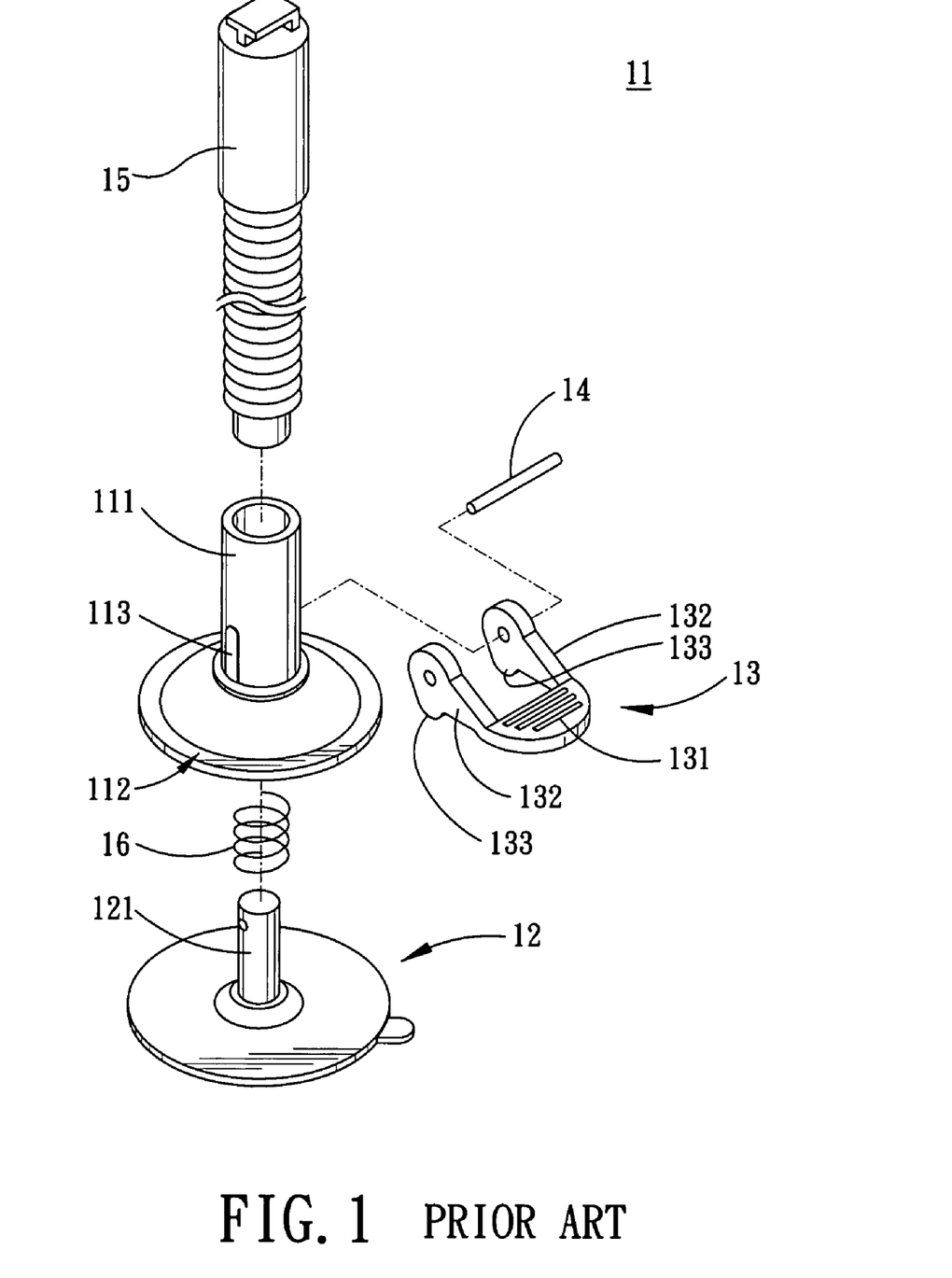
FIG. 1 is an exploded perspective view showing a conventional supporting device.
Figure 2:
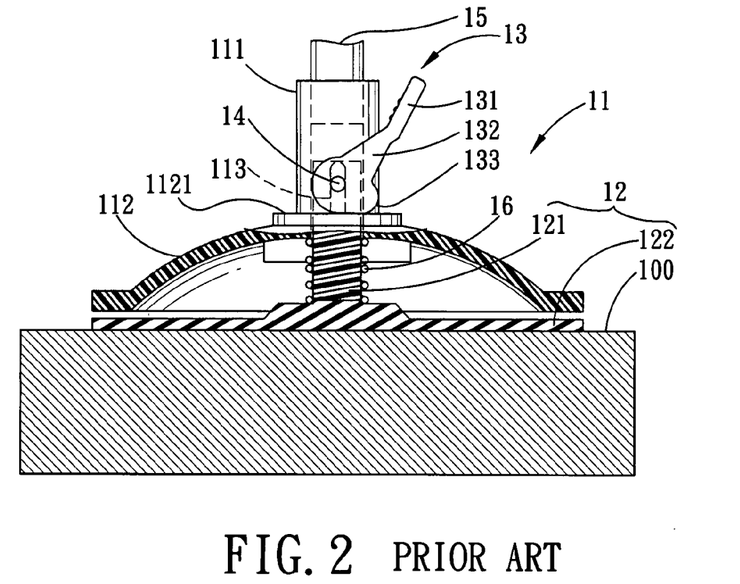
FIG. 2 is a schematic partly sectional view showing a suction device of the conventional supporting device when in a non-sucking state.

FIGS. 1 and 2 illustrate a conventional supporting device 11 disclosed in U.S. Pat. No. 7,092,521. The conventional supporting device 11 includes: a hollow base 112; a sleeve 111 extending upwardly from the center of the top of the base 112 and having an upper end coupled to a supporting rod 15 that has a clamping end capable of clamping a mobile phone (not shown); a sucking member 12 having a flexible disc body 122 disposed under the base 112, and a tubular connecting rod 121 connected to a central portion of the disc body 122 and extending upwardly through the base 112 and into the sleeve 111; and an operating member 13 disposed outwardly of the sleeve 111 and having an operating plate portion 131, and two connecting arm portions 132 connected to the operating plate portion 131. Each connecting arm portion 132 of the operating member 13 has a pivot end 133 in the form of a cam abutting against a top surface 1121 of the base 112 and connected pivotally to a corresponding one of opposite ends of a pivot rod 14 that extends through two aligned vertical slide slots 113 in the sleeve 111 (only one is shown) and the connecting rod 121, and that is movable vertically relative to the sleeve 111. A coil spring 16 is sleeved on the connecting rod 121, and is disposed between the base 112 and the disc body 122 for biasing the base 112 to move upwardly.

Figure 3:
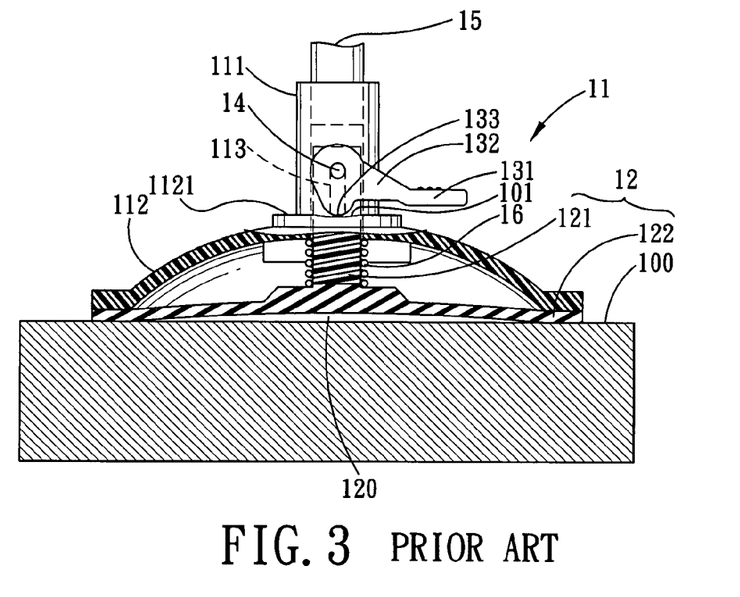
FIG. 3 is a schematic partly sectional view showing the suction device of the conventional suction device when in a sucking state.

The supporting device 11 can be switched from a non-sucking state, where the base 112 is spaced apart from the sucking member 12 and where the operating plate portion 131 is pivoted away from the base 112, as shown in FIG. 2, to a sucking state, where a peripheral portion of the disc body 122 is attached sealingly to a supporting surface 100 as a result of pressing of the base 112 thereon and where a central portion of the disc body 122 is pulled upwardly, thereby forming a vacant space 120 between the supporting surface 100 and the central portion of the disc body 122, as shown in FIG. 3, by operating the operating plate portion 131 of the operating member 13. In actual operation of the supporting device 11 from the non-sucking state to the sucking state, the operating plate portion 131 of the operating member 13 is pivoted toward the base 112 such that, initially, the base 112 moves downwardly toward the disc body 122 due to pressing of the pivot end 133, so as to abut against the peripheral portion of the disc body 122, and then, an assembly of the pivot rod 14, the pivot ends 133 of the connecting arm portions 132 of the operating member 13, the connecting rod 121 and the central portion of the disc body 12 moves upwardly, thereby forming the vacant space 120.

In such a configuration, during the pivoting movement of the operating member 13, the pivot ends 133 of the connecting arm portions 132 of the operating member 13 are always in contact with the top surface 1121 of the base 112, thereby resulting in wearing of the top surface 1121 of the base 112, as indicated by reference numeral 101 in FIG. 3, after a long period of use. Due to wearing of the top surface 1121 of the base 112, the supporting device 11 cannot be accurately and stably positioned in the sucking state.

SUMMARY OF THE INVENTION

Therefore, the object of the present invention is to provide a suction device, and a supporting device having the same that can be stably positioned on a supporting surface.

According to one aspect of the present invention, a suction device comprises:

an upright sleeve having an annular surrounding wall formed with two aligned through holes;

a sucking member having a flexible disc body disposed under the sleeve and having a peripheral portion that is adapted to be attached sealingly to a supporting surface and that abuts against the sleeve, and a central portion connected integrally to the peripheral portion and adapted to be spaced apart from the supporting surface, and a connecting body connected to the central portion of the disc body and extending upwardly into the sleeve;

a connecting member disposed in the sleeve, and having a lower end portion connected to the connecting body of the sucking member so as to allow synchronous movement of the connecting member and the connecting body of the sucking member, an upper end portion, and a cam-accommodating space defined between the lower end portion and the upper end portion;

a cam body disposed rotatably in the cam-accommodating space in the connecting member and having an axial hole;

a pivot rod extending through the through holes in the annular surrounding wall of the sleeve and pivotable relative to the sleeve about a central axis thereof, the pivot rod having two opposite ends extending outwardly from the sleeve, and a central rod portion extending through and engaging the axial hole in the cam body such that the cam body is pivotable together with the pivot rod; and an operating member disposed outwardly of the sleeve and connected to at least one of the ends of the pivot rod.

The operating member is operable so as to pivot an assembly of the pivot rod and the cam body relative to the sleeve such that an assembly of the connecting member and the connecting body of the sucking member is pushed by the cam body to move upwardly away from the supporting surface, thereby forming a vacant space between the central portion of the disc body of the sucking member and the supporting surface.

According to another aspect of the present invention, there is provided a supporting device adapted for an electronic device. The supporting device comprises:

a suction device including an upright sleeve having an annular surrounding wall formed with two aligned through holes, a sucking member having a flexible disc body disposed under the sleeve and having a peripheral portion that is adapted to be attached sealingly to a supporting surface and that abuts against the sleeve, and a central portion connected integrally to the peripheral portion and adapted to be spaced apart from the supporting surface, and a connecting body connected to the central portion of the disc body and extending upwardly into the sleeve, a connecting member disposed in the sleeve, and having a lower end portion connected to the connecting body of the sucking member so as to allow synchronous movement of the connecting member and the connecting body of the sucking member, an upper end portion, and a cam-accommodating space defined between the lower end portion and the upper end portion, a cam body disposed rotatably in the cam-accommodating space in the connecting member and having an axial hole, a pivot rod extending through the through holes in the annular surrounding wall of the sleeve and pivotable relative to the sleeve about a central axis thereof, the pivot rod having two opposite ends extending outwardly from the sleeve, and a central rod portion extending through and engaging the axial hole in the cam body such that the cam body is pivotable together with the pivot rod, and an operating member disposed outwardly of the sleeve and connected to at least one of the ends of the pivot rod; and a supporting member having an inserting end portion inserted into an upper end of the sleeve of the suction device, and a mounting end portion adapted to be mounted with the electronic device thereon.

The operating member is operable so as to pivot an assembly of the pivot rod and the cam body relative to the sleeve such that an assembly of the connecting member and the connecting body of the sucking member is pushed by the cam body to move upwardly away from the supporting surface, thereby forming a vacant space between the central portion of the disc body of the sucking member and the supporting surface.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 4:
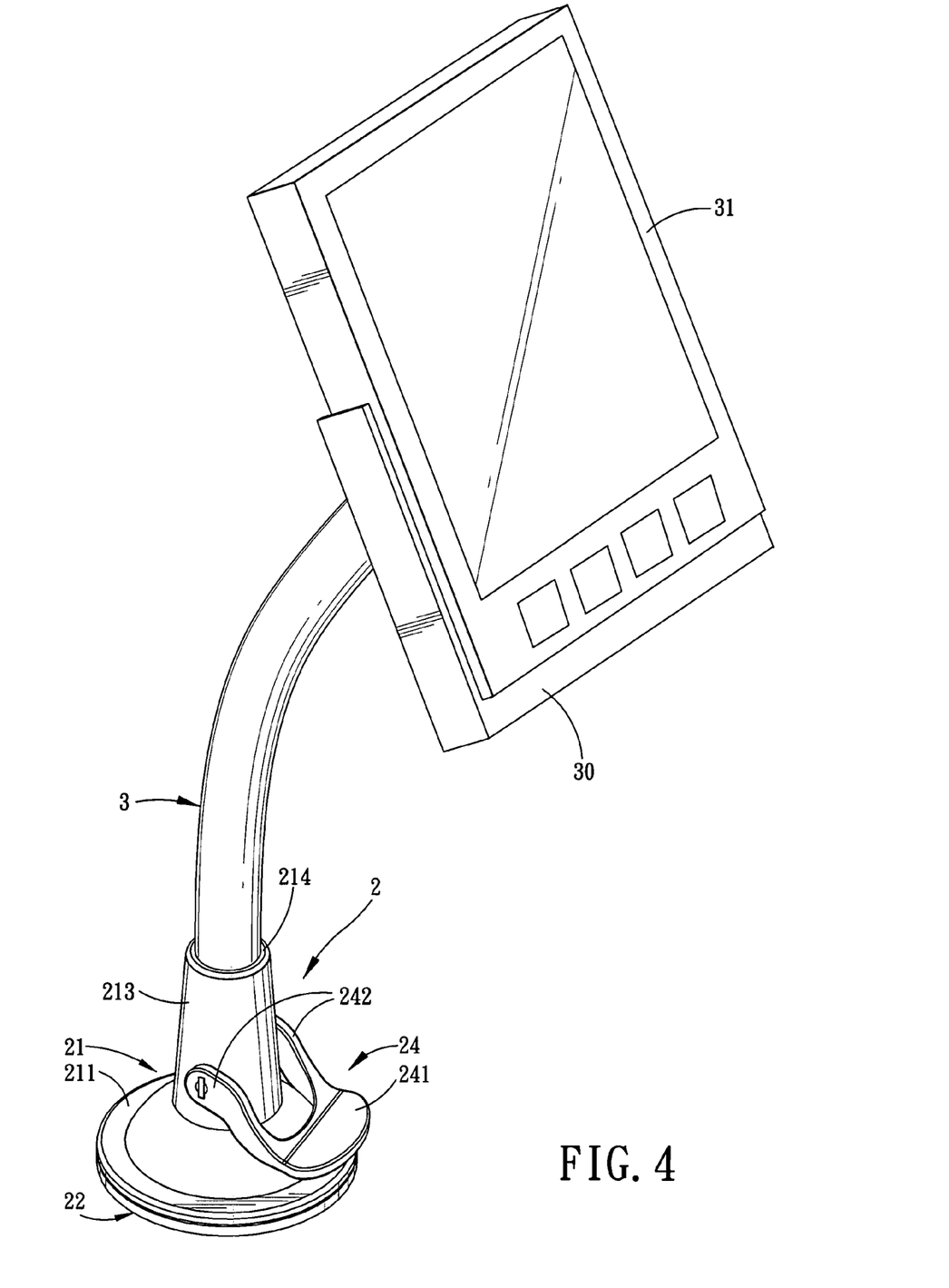
FIG. 4 is a perspective view showing the first preferred embodiment of a suction device according to the present invention, together with a supporting member to form a supporting device for an electronic device.
Figure 5:
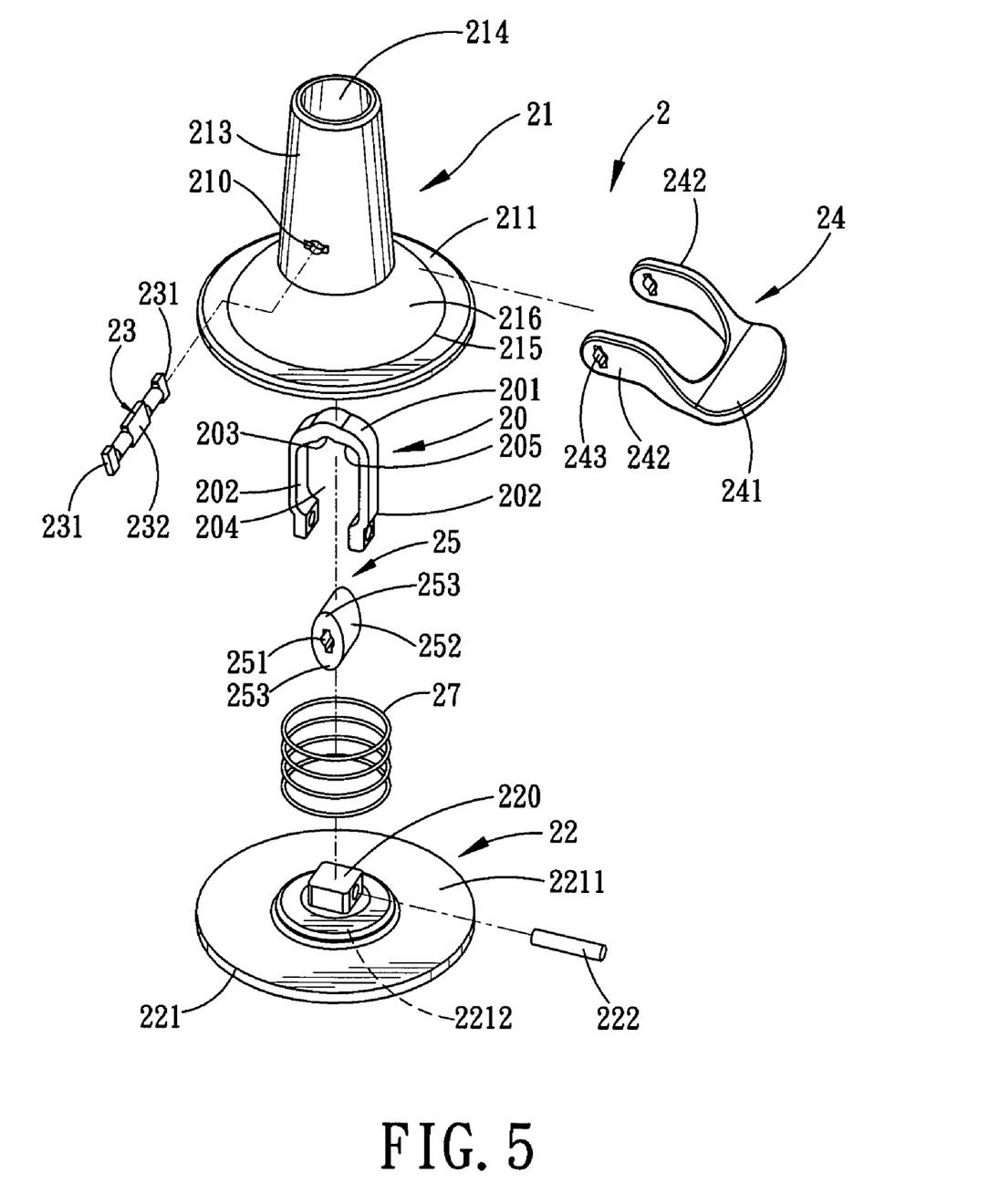
FIG. 5 is an exploded perspective view showing the first preferred embodiment.
Figure 6:
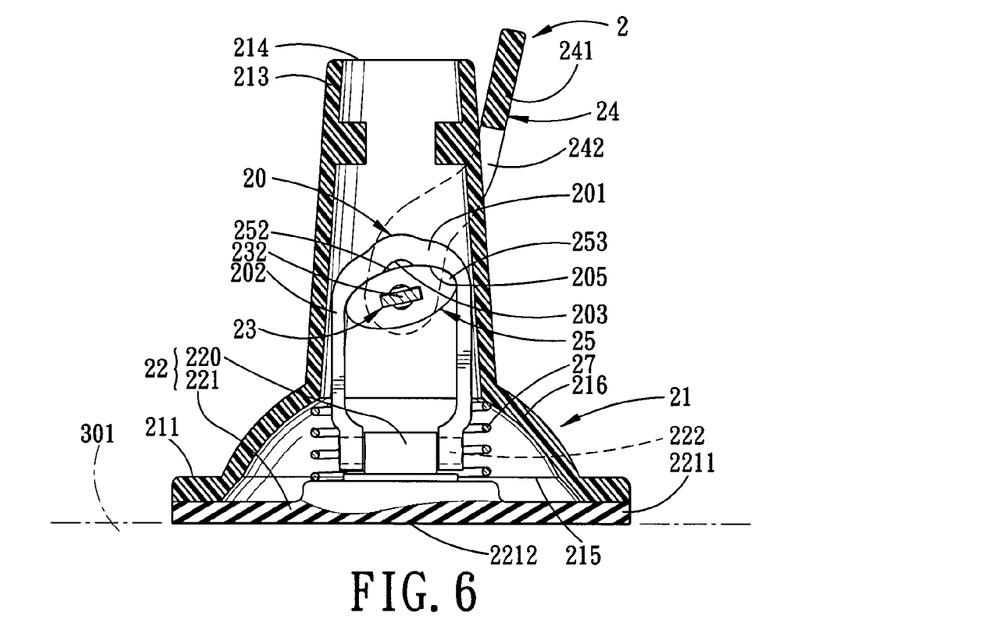
FIG. 6 is a schematic partly sectional view showing the first preferred embodiment when in a non-sucking state.

Referring to FIGS. 4 to 6, the first preferred embodiment of a suction device 2 according to the present invention is shown to include an upright sleeve 21, a sucking member 22, a connecting member 20, a cam body 25, a pivot rod 23, and an operating member 24.

The sleeve 21 has an open top end 214, an open bottom end 215, and a lower end portion 216 having a diameter that increases gradually toward the bottom end 215 (see FIG. 6). The sleeve 21 further has an annular flange 211 that extends radially, horizontally and outwardly from the bottom end 215, and an annular surrounding wall 213 formed with two aligned through holes 210. In this embodiment, the sleeve 21 is adapted to permit insertion of an inserting end portion of a supporting member 3 thereinto via the top end 214. The supporting member 3 has a mounting end portion 30 for mounting an electronic device 31 thereon, such as a mobile phone, a PDA, or a satellite navigation device, as shown in FIG. 4. As such, the suction device 2 is adapted to cooperate with the support member 3 to constitute a repositionable supporting device for the electronic device 31.

The sucking member 22 has a flexible disk body 221 and a connecting body 220. The disc body 221 is disposed under the sleeve 21, and has a peripheral portion 2211 that is adapted to be attached sealingly to a supporting surface 301 and that is pressed by the annular flange 211 of the sleeve 21, and a central portion 2212 connected integrally to the peripheral portion 2211 and adapted to be spaced apart from the supporting surface 301. The connecting body 220 is connected fixedly to the central portion 2212 of the disc body 221, and extends upwardly into the sleeve 21.

The connecting member 20 is disposed in the sleeve 21, and has a lower end portion connected to the connecting body 220 of the sucking member 22 so as to allow synchronous movement of the connecting member 20 and the connecting body 220 of the sucking member 22, an upper end portion, and a cam-accommodating space 204 defined between the lower end portion and the upper end portion. In this embodiment, the connecting member 20 is a generally inverted U-shaped plate that has parallel lateral plate portions 202 having lower ends that constitute the lower end portion of the connecting member 20 and that are connected to the connecting body 220 of the sucking member 22 using a connecting bolt 222, and an intermediate plate portion 201 that constitutes the upper end portion of the connecting member 20, that interconnects upper ends of the lateral plate portions 202, and that cooperates with the lateral plate portions 202 to define the cam-accommodating space 204. In this embodiment, the intermediate plate portion 201 of the connecting member 20 has an inner surface 205 formed with a positioning recess 203.

The cam body 25 is disposed rotatably in the cam-accommodating space 204 in the connecting member 20, and has an axial hole 251. In this embodiment, the cam body 25 is elliptical, and has two projecting edge portions 253 opposite to each other along a major axis thereof. In an alternative embodiment, the cam body can be rhombic, and is chamfered at each corner portion thereof.

The pivot rod 23 extends through the through holes 210 in the annular surrounding wall 213 of the sleeve 21, and is pivotable relative to the sleeve 21 about a central axis thereof. The pivot rod 23 has two opposite ends 231 extending outwardly from the sleeve 21, and a central rod portion 232 extending through and engaging the axial hole 251 in the cam body 25 such that the cam body 25 is pivotable together with the pivot rod 23. When the cam body 25 rotates in the sleeve 21, one of the projecting edge portions 253 of the cam body abuts movably against the inner surface 205 of the intermediate plate portion 201 of the connecting member 20 so as to push upwardly the connecting member 20, as shown in FIG. 7.

The operating member 24 is disposed outwardly of the sleeve 21. In this embodiment, the operating member 24 has an operating plate portion 241, and two connecting arm portions 242 connected integrally to the operating plate portion 241. Each connecting arm portion 242 is formed with an engaging hole 243 that engages a corresponding one of the ends 231 of the pivot rod 23. It is noted that, in an alternative embodiment, the operating member 24 may have a single connecting arm portion 242 formed with an engaging hole 243 that engages one of the ends 231 of the pivot rod 23.

Figure 7:
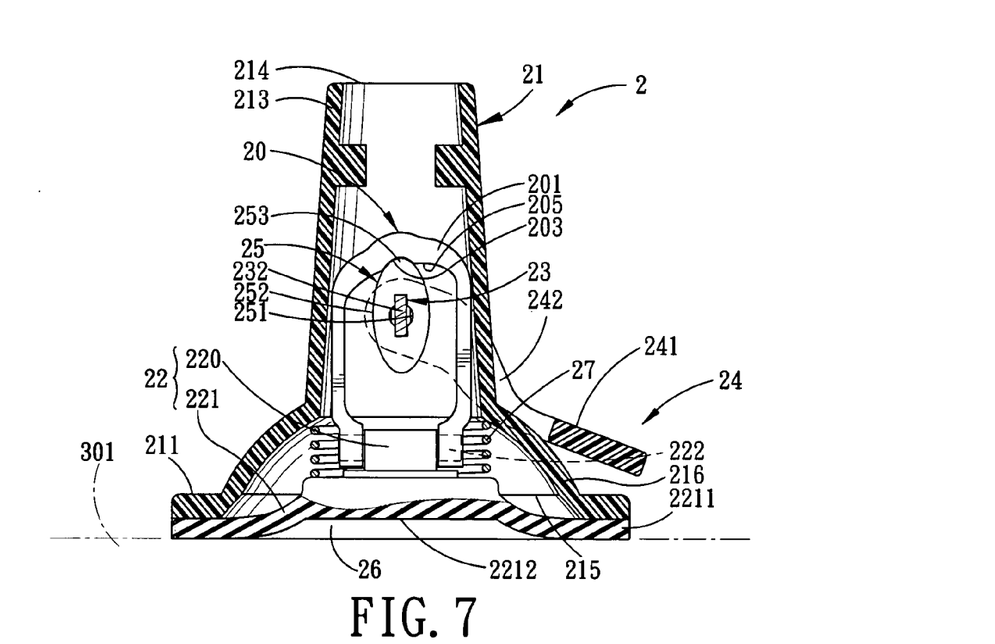
FIG. 7 is a schematic partly sectional view showing the first preferred embodiment when in a sucking state.

In actual operation, the operating plate portion 241 of the operating member 24 is moved downwardly toward the lower end portion 216 so as to pivot an assembly of the pivot rod 23 and the cam body 25 relative to the sleeve 21 such that an assembly of the connecting member 20 and the connecting body 220 of the sucking member 22 is pushed by the cam body 25 to move upwardly away from the supporting surface 301, thereby forming a vacant space 26 between the central portion 2212 of the disc body 221 of the sucking member 22 and the supporting surface 301, as best shown in FIG. 7. Hence, the suction device 2 is in a sucking state. It is noted that, when the suction device 2 is in the sucking state, one of the projecting edge portions 253 of the cam body 25 engages the positioning recess 203 in the inner surface 205 of the intermediate plate portion 201 of the connecting member 20 so as to stably position the cam body 25 in the sleeve 21 (see FIG. 7), thereby maintaining the vacant space 26 between the central portion 2212 of the disc body 221 of the sucking member 22 and the supporting surface 301. On the other hand, when the suction device 2 is in a non-sucking state, as shown in FIG. 6, in this embodiment, a part of an annular surrounding surface 252 of the cam body 25 abuts against the inner surface 205 of the intermediate plate portion 201 of the connecting member 20. However, such abutment is not necessary in other embodiments.

Furthermore, the suction device 2 further includes a coil spring 27, which is disposed in the sleeve 21, is sleeved around the connecting member 20., and has opposite ends abutting respectively against the lower end portion 216 of the sleeve 21 and the central portion 2212 of the disk body 221, for biasing the central portion 2212 of the disk body 221 to move downwardly when the projecting edge portions 253 of the cam body 25 disengages the positioning recess 203 in the inner surface 205 of the intermediate plate portion 201 of the connecting member 20.

In this invention, since the cam body 25 is disposed in the sleeve 21, frictional wearing of the top surface 1121 of the base 112 (see FIG. 3) as encountered in the prior art can be avoided. Furthermore, due to the presence of the positioning recess 203 in the inner surface 205 of the intermediate plate portion 201 of the connecting member 20, the cam body 25 can be stably positioned in the sleeve 21 so as to maintain the vacant space 26 when the suction device 2 is in the sucking state, thereby enabling the suction device 2 of the present invention to be positioned stably on the supporting surface 301.

Figure 8:
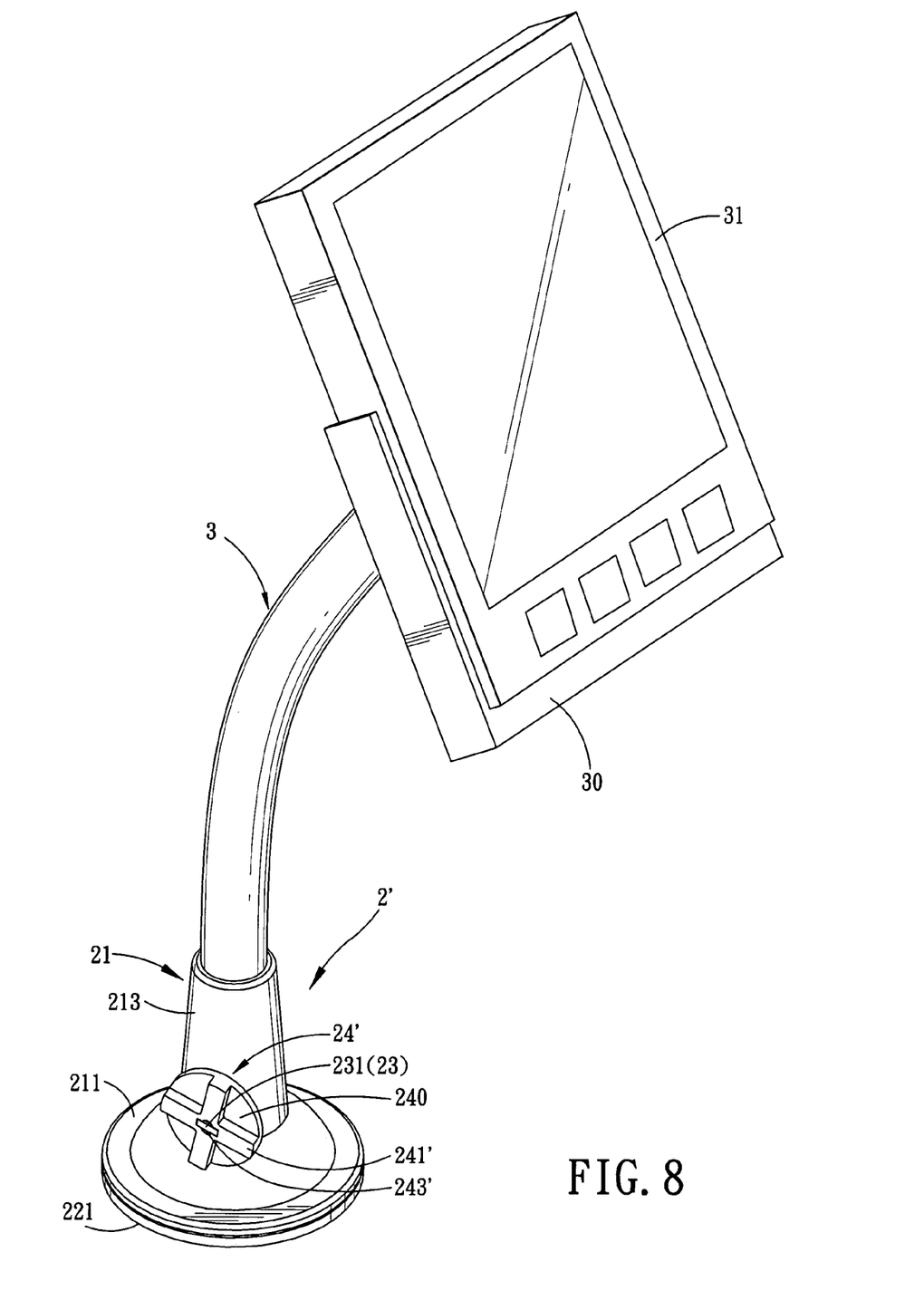
FIG. 8 is a perspective view showing the second preferred embodiment of a suction device according to the present invention, together with a supporting member to form a supporting device for an electronic device.
Figure 9:
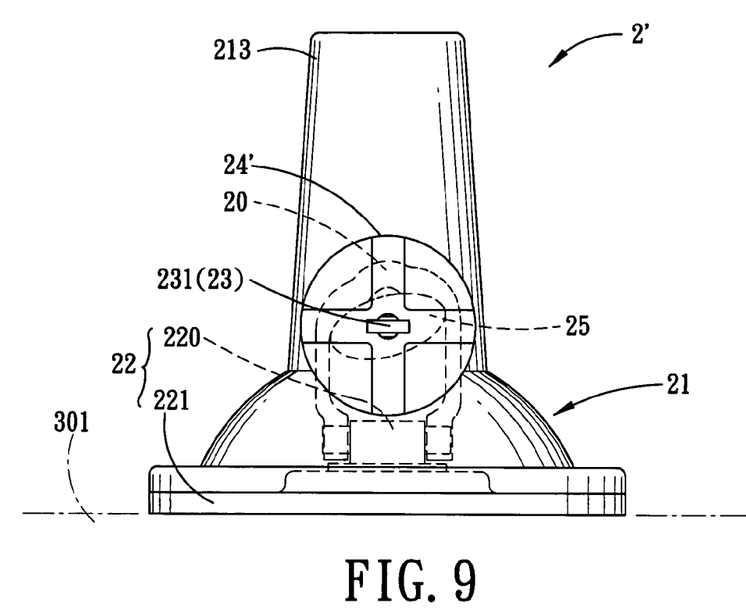
FIG. 9 is a schematic view showing the second preferred embodiment when in a non-sucking state.
Figure 10:
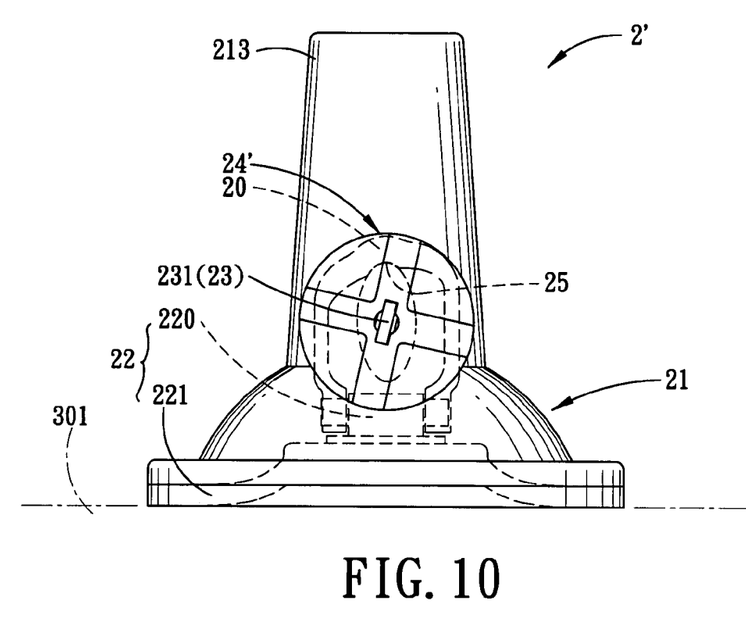
FIG. 10 is a schematic view showing the second preferred embodiment when in a sucking state.

FIGS. 8 to 10 illustrate the second preferred embodiment of a suction device 2' according to this invention, which is a modification of the first preferred embodiment. In this embodiment, the operating member 24' is a circular plate formed with a cross-shaped rib 241' on a side surface 240 thereof, and a central engaging hole 243' that engages one of the ends 231 of the pivot rod 23. In such a configuration, the operating member 24' is rotatable to operate the suction device 2' in a selected one of the non-sucking state (see FIG. 9) and the sucking state (see FIG. 10).

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A suction device comprising:
   an upright sleeve having an annular surrounding wall formed with two aligned through holes;
   a sucking member having a flexible disc body disposed under said sleeve and having a peripheral portion that is adapted to be attached sealingly to a supporting surface and that abuts against said sleeve, and a central portion connected integrally to said peripheral portion and adapted to be spaced apart from the supporting surface, and a connecting body connected to said central portion of said disc body and extending upwardly into said sleeve;
   a connecting member disposed in said sleeve, and having a lower end portion connected to said connecting body of said sucking member so as to allow synchronous movement of said connecting member and said connecting body of said sucking member, an upper end portion, and a cam-accommodating space defined between said lower end portion and said upper end portion;
   a cam body disposed rotatably in said cam-accommodating space in said connecting member and having an axial hole;
   a pivot rod extending through said through holes in said annular surrounding wall of said sleeve and pivotable relative to said sleeve about a central axis thereof, said pivot rod having two opposite ends extending outwardly from said sleeve, and a central rod portion extending through and engaging said axial hole in said cam body such that said cam body is pivotable together with said pivot rod; and
   an operating member disposed outwardly of said sleeve and connected to at least one of said ends of said pivot rod;
   wherein said operating member is operable so as to pivot an assembly of said pivot rod and said cam body relative to said sleeve such that an assembly of said connecting member and said connecting body of said sucking member is pushed by said cam body to move upwardly away from the supporting surface, thereby forming a vacant space between said central portion of said disc body of said sucking member and the supporting surface; and
   wherein said connecting member is a generally inverted U-shaped plate that has opposite lateral plate portions connected respectively to opposite sides of said connecting body of said sucking member, and an intermediate plate portion interconnecting said lateral plate portions, cooperating with said lateral plate portions to define said cam-accommodating space, and abutting against said cam body when said vacant space is formed.

2. The suction device as claimed in claim 1, wherein:
   said intermediate plate portion of said connecting member has an inner surface; and
   said cam body is elliptical and has two projecting edge portions opposite to each other along a major axis thereof such that, when said cam body rotates in said sleeve, one of said projecting edge portions of said cam body abuts movably against said inner surface of said intermediate plate portion of said connecting member so as to push upwardly said connecting member.

3. The suction device as claimed in claim 2, wherein said inner surface of said intermediate plate portion of said connecting member is formed with a positioning recess that engages said one of said projecting edge portions of said cam body so as to position said cam body in said sleeve when said vacant space is formed, thereby maintaining said vacant space between said central portion of said disc body of said sucking member and the supporting surface.

4. The suction device as claimed in claim 3, wherein said sleeve further has a lower end portion, said suction device further comprising a coil spring disposed in said sleeve and sleeved around said connecting member, said coil spring having opposite ends abutting respectively against said lower end portion of said sleeve and said central portion of said disk body for biasing said central portion of said disk body to move downwardly when said projecting edge portions of said cam body disengages said positioning recess in said inner surface of said intermediate plate portion of said connecting member.

5. The suction device as claimed in claim 1, wherein said operating member has an operating plate portion, and a connecting arm portion connected to said operating plate portion and formed with an engaging hole that engages said pivot rod.

6. The suction device as claimed in claim 1, wherein said sleeve further has an annular flange extending radially, horizontally and outwardly from a bottom end thereof and pressing downwardly against said peripheral portion of said disc body of said sucking member.

7. A supporting device adapted for an electronic device, comprising:
- a suction device including
  - an upright sleeve having an annular surrounding wall formed with two aligned through holes,
  - a sucking member having a flexible disc body disposed under said sleeve and having a peripheral portion that is adapted to be attached sealingly to a supporting surface and that abuts against said sleeve, and a central portion connected integrally to said peripheral portion and adapted to be spaced apart from the supporting surface, and a connecting body connected to said central portion of said disc body and extending upwardly into said sleeve,
  - a connecting member disposed in said sleeve, and having a lower end portion connected to said connecting body of said sucking member so as to allow synchronous movement of said connecting member and said connecting body of said sucking member, an upper end portion, and a cam-accommodating space defined between said lower end portion and said upper end portion,
  - a cam body disposed rotatably in said cam-accommodating space in said connecting member and having an axial hole,
  - a pivot rod extending through said through holes in said annular surrounding wall of said sleeve and pivotable relative to said sleeve about a central axis thereof, said pivot rod having two opposite ends extending outwardly from said sleeve, and a central rod portion extending through and engaging said axial hole in said cam body such that said cam body is pivotable together with said pivot rod, and
  - an operating member disposed outwardly of said sleeve and connected to at least one of said ends of said pivot rod; and
- a supporting member having an inserting end portion inserted into an upper end of said sleeve of said suction device, and a mounting end portion adapted to be mounted with the electronic device thereon;

wherein said operating member is operable so as to pivot an assembly of said pivot rod and said cam body relative to said sleeve such that an assembly of said connecting member and said connecting body of said sucking member is pushed by said cam body to move upwardly away from the supporting surface, thereby forming a vacant space between said central portion of said disc body of said sucking member and the supporting surface; and wherein said connecting member of said suction device is a generally inverted U-shaped plate that has opposite lateral plate portions connected respectively to opposite sides of said connecting body of said sucking member, and an intermediate plate portion interconnecting said lateral plate portions, cooperating with said lateral plate portions to define said cam-accommodating space, and abutting against said cam body when said vacant space is formed.

8. The supporting device as claimed in claim 7, wherein:
said intermediate plate portion of said connecting member of said suction device has an inner surface; and
said cam body of said suction device is elliptical and has two projecting edge portions opposite to each other along a major axis thereof such that, when said cam body rotates in said sleeve, one of said projecting edge portions of said cam body abuts movably against said inner surface of said intermediate plate portion of said connecting member so as to push upwardly said connecting member.

9. The supporting device as claimed in claim 8, wherein said inner surface of said intermediate plate portion of said connecting member of said suction device is formed with a positioning recess that engages said one of said projecting edge portions of said cam body so as to position said cam body in said sleeve when said vacant space is formed, thereby maintaining said vacant space between said central portion of said disc body of said sucking member and the supporting surface.

10. The supporting device as claimed in claim 9, wherein said sleeve of said suction device further has a lower end portion; and said suction device further includes a coil spring disposed in said sleeve and sleeved around said connecting member, said coil spring having opposite ends abutting respectively against said lower end portion of said sleeve and said central portion of said disk body for biasing said central portion of said disk body to move downwardly when said projecting edge portions of said cam body disengages said positioning recess in said inner surface of said intermediate plate portion of said connecting member.

11. The supporting device as claimed in claim 7, wherein said operating member of said suction device has an operating plate portion, and a connecting arm portion connected to said operating plate portion and formed with an engaging hole that engages said pivot rod.

12. The supporting device as claimed in claim 7, wherein said sleeve of said suction device further has an annular flange extending radially, horizontally and outwardly from a bottom end thereof and pressing downwardly against said peripheral portion of said disc body of said sucking member.

* * * * *